United States Patent [19]
Taylor, Jr. et al.

[11] 4,137,532
[45] Jan. 30, 1979

[54] VIP DOPPLER FILTER BANK SIGNAL PROCESSOR FOR PULSE DOPPLER RADAR

[75] Inventors: John W. Taylor, Jr., Baltimore; Raymond G. Martin, Ellicott City, both of Md.

[73] Assignee: Westinghouse Electric Corp., Pittsburgh, Pa.

[21] Appl. No.: 792,279

[22] Filed: Apr. 29, 1977

[51] Int. Cl.² .......................... G01S 9/42; G01S 7/30
[52] U.S. Cl. .............................. 343/7.7; 343/17.1 PF
[58] Field of Search ........................ 343/7.7, 17.1 PF

[56] References Cited
U.S. PATENT DOCUMENTS

| | | | |
|---|---|---|---|
| 3,343,162 | 1/1967 | Evans | 343/7.7 |
| 3,404,399 | 10/1968 | Eschner, Jr. | 343/7.7 |
| 3,480,953 | 11/1969 | Shreve | 343/7.7 |
| 3,560,972 | 2/1971 | Taylor, Jr. | 343/7.7 |
| 3,566,402 | 2/1971 | Taylor, Jr. | 343/7.7 |
| 3,787,851 | 1/1974 | Hughes | 343/17.1 PF |
| 4,057,800 | 11/1977 | Ganz | 343/17.1 PF |

Primary Examiner—Maynard R. Wilbur
Assistant Examiner—Lawrence Goodwin
Attorney, Agent, or Firm—H. W. Patterson

[57] ABSTRACT

A low PRF pulse doppler radar system utilizing a VIP digital filter bank signal processor to suppress echoes from terrain, rain, and chaff, and pass echoes from aircraft moving at higher speeds is disclosed.

Each of a plurality of VIP filters individually provides high attenuation to undesired signals over designated frequency bands, the width of which are a large fraction of $1/T_{av}$ where $T_{av}$ is the average interpulse period. Little or no attenuation of desired signals having doppler frequencies greater than $1/T_{av}$ occurs. The outputs of the plurality of filters are desensitized to prevent false alarm from clutter, and the presence of a desired radar pulse echo is determined by a comparison with a threshold level.

10 Claims, 15 Drawing Figures

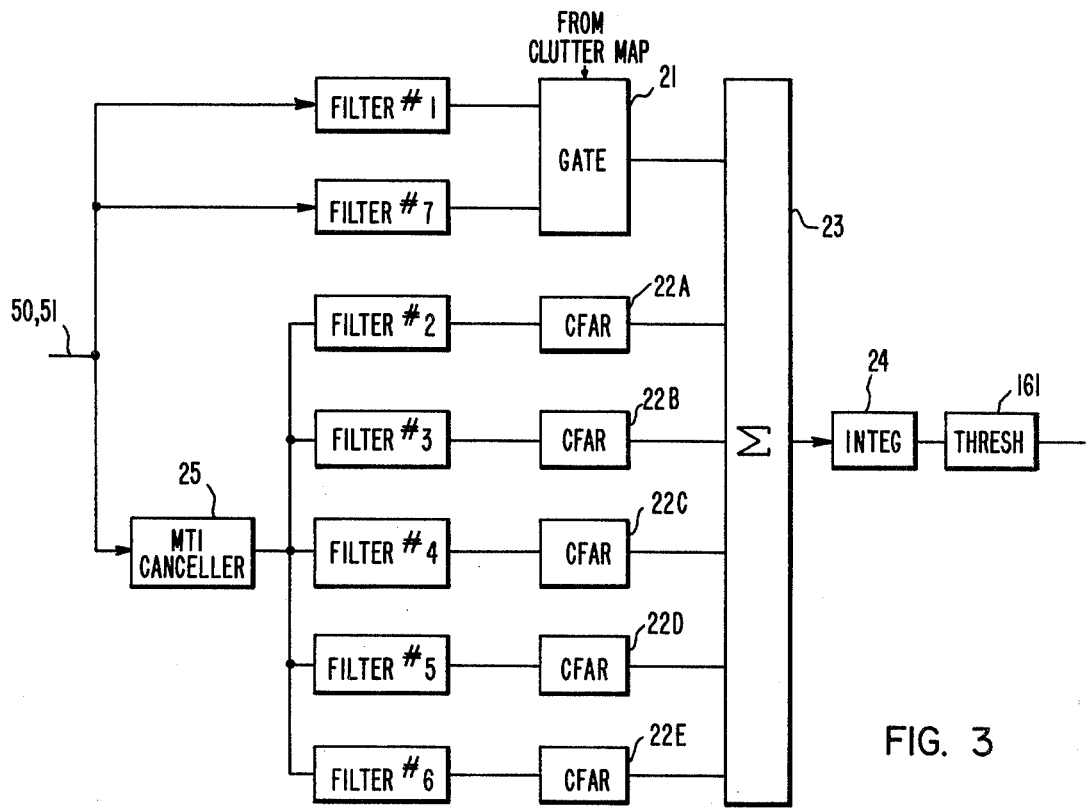
FIG. 3
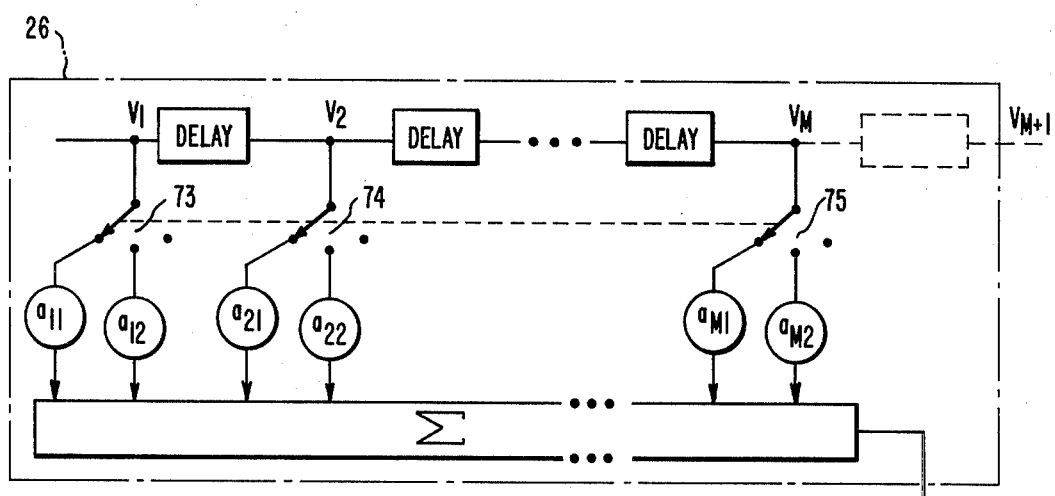
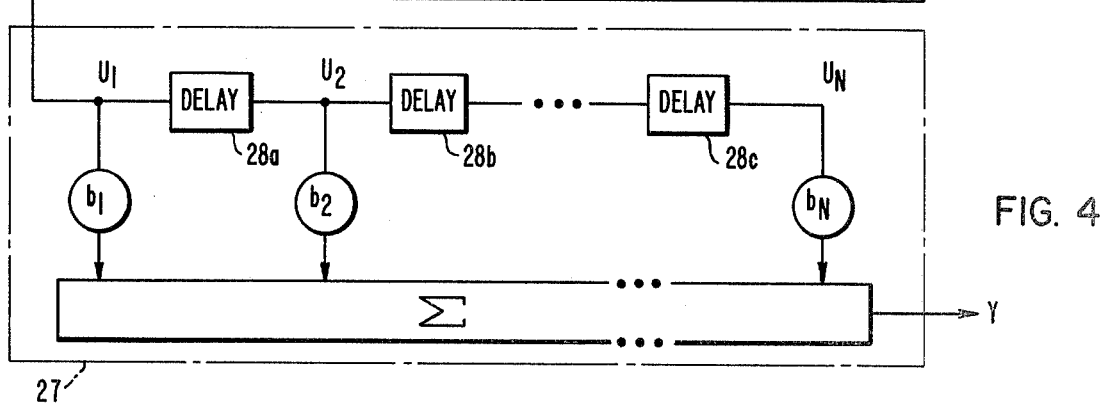
FIG. 4

VIP DOPPLER FILTER BANK SIGNAL PROCESSOR FOR PULSE DOPPLER RADAR

CROSS-REFERENCE TO RELATED APPLICATION

Reference is made to a related copending U.S. application filed in the U.S. Patent Office on Mar. 10, 1976, bearing Ser. No. 665,643, and assigned to a common assignee. This application relates to an MTI radar system utilizing variable interpulse periods and weighting with a cascaded two and three pulse canceler.

BACKGROUND OF THE INVENTION

1. Field of the Invention

The present invention relates to pulse doppler or moving target indicator (MTI) radar systems; and more particularly, to an improved digital filter bank signal processor utilizing variable interpulse periods and weighting.

2. Description of the Prior Art

Moving target indication (MTI) radar is provided to reject signals or echoes from stationary and slowly moving objects, such as terrain, foliage or surface vehicles; and to pass echoes from moving objects such as aircraft. The radar receivers may utilize digital filters to suppress such undesired echoes; and these filters are generally described as moving target indicators. The MTI signal processor utilizes the doppler shift caused by the reflected signal of a moving target to distinguish moving targets from fixed targets. In a pulse-radar system this doppler shift appears as a change of phase of received signals between consecutive radar pulses. Assuming that the radar transmits a pulse of RF energy, which is reflected by ground clutter and a moving target such as an airplane, the reflected pulses return to the radar antenna within a certain length of time. The radar then transmits a second pulse. The reflection from the ground clutter occurs in exactly the same amount of time for both the first and second transmitted pulses, but the reflection from the aircraft occurs in more or less time, because the aircraft has moved either closer to or away from the radar in the interval between transmitted pulses. The time change between the first and second transmitted pulses is determined by comparing the phase of the received signal with the phase of the reference oscillator in the radar. If the target is fixed the relative phase of consecutive received pulses does not change. For a target that moves between pulses, the phase of the received pulses change.

In the event of both wind and rain, such moving rain may be detected as a moving target rather than clutter. Wind conditions vary as a function of altitude, a condition known as "wind shear", so rain echoes cover a band of velocities. Particularly, when the radar antenna is scanning and is pointed either directly into the wind or with the wind, the rain clutter will present the greatest radial velocity relative to the radar, and this could be in the order of 40–60 knots. Inasmuch as such a low velocity does not often exist in the detection of flying aircraft, the system can be so constructed to reject any clutter or interference that has a radial velocity equal to that of the rain. A flying aircraft can create such low radial velocity when the aircraft is flying nearly tengentially relative to the antenna.

In the past, such systems have been constructed either as single channel filtering systems, generally known as MTI circuits, or as multiple channel filter systems, recently given the name of MTD circuits. In the single channel or MTI approach it is necessary that the clutter rejection filters be designed to reject clutter at all possible velocities simultaneously; for example, the filter rejection notch might need to extend from −50 knots to +50 knots in order to cope with any possible wind condition in the case of rain clutter, even though the actual rain clutter present at any one instant, corresponding to a particular antenna pointing direction, would be unlikely to extend over the entire notch region. To avoid this restriction, the multiple channel or MTD approach may be employed to provide a system of filters which is adaptive to the actual clutter conditions present at any instant. Thus, for example, a bank of filters may be used, which in aggregate cover the velocity range −50 to +50 knots but each of which has a narrower velocity coverage over a small part of that velocity range. Each filter in the bank may then be equipped with Constant False Alarm Rate (CFAR) circuits, of a conventional nature, at its output, such that in the presence of interfering clutter, such as rain clutter, the particular filters, into which the rain echoes fall, are desensitized by their CFAR circuits to the extent necessary to prevent detection of the rain clutter, whereas the remaining filters, in which rain clutter echoes are not present, retain their full sensitivity to detect aircraft targets. Thus, the CFAR circuits of the multiple filter approach enable the detection system to respond adaptively to a clutter interference environment which is changing with time, as a result, for example, of the effects of antenna scanning.

It may be noted that the conventional CFAR circuits referred to above for the individual filter outputs may be implemented in a variety of alternative ways; for example, suitable well known CFAR methods are: cell-averaging CFAR, log CFAR, or hard-limiting types of CFAR such as CPACS (Coded Pulse Anti-Clutter System).

There are times, when the received signal is shifted precisely 360°, or multiplies thereof, between pulses. Such as the case, when the targets move ½, 1, 3/2, etc. wavelengths between consecutive transmitted pulses. Thus, where the radar system is so structured to provide a zero output not only for stationary targets or clutter but also from targets up to 50 knots for example, to reject wind blown rain, such problem is aggravated. Because not only are the multiples of 360° phase shift rejected, but also a band of phase shifts adjacent to the multiples corresponding to the wind and rain clutter for a particular area. This rejection of the frequency multiples which are echoed from a moving target are known as "blind speeds". Thus, blind speeds represent the frequency ambiguity inherent in a sample data system when the interval between data samples (interpulse period) is fixed. The echoes generated by an object moving an integer number of half-wavelengths toward or away from the radar antenna during the interpulse period are indistinguishable from those of a stationary object. Therefore, if ground clutter interferences are rejected by the filter bank, the system also is blind to aircraft speeds which create these ambiguous doppler frequencies.

Heretofore, filters for such radars were implemented with analog devices such as capacitors, inductors and resistors. However, more recently digital filters have been utilized primarily because of lower cost of implementation when a large number of range cells must be covered. In both the analog and digital implementations, the echoes of the radar receiver are sampled at an interval equal to or less than the range resolution of the radar. Successive radar transmissions provide a multiplicity of samples for each of range cell of interest, which create the inputs for a bank of filters at each point in range.

Most digital processors or filters utilize the Discrete Fourier Transform mathematical operation to convert time separated data inputs into frequency dependent data outputs. Although the Fast Fourier Transform is a practical configuration which reduces the number of mathematical operations which must be performed, it requires the data input be collected at a fixed interpulsed period, which does not eliminate the "blind speed" deficiency. Also, analog filters suffer from the same blind speed deficiency; in that they do not provide the desired rejection of interference frequencies if the interpulse period is variable; and of course, a fixed interpulse period creates blind speeds.

One of the virtues of digital implementation of MTI filters is the ability to quickly shift from one pulse repetition frequency to another so that a target that is blind to one pulse repetition frequency (PRF) is visible on another. Unfortunately, desired azimuth beam widths and scan rates of the antenna generally do not provide an adequate number of echoes as the beam scans across the target for this solution to be effective.

The previously mentioned MTD system, implemented for an airport surveillance radar operating at a frequency of 3 GHz., employs two interpulse periods: a burst of ten pulses having a minimal interpulse period for the desired range coverage, followed by a second burst of ten pulses with a 25% longer interpulse period. The combination of azimuth beam widths, scan rate, and PRF provide 23 hits per beam width, between −6 dB points of echo amplitude, which is barely enough for the use of two different PRF's. The 25% spread of PRF's is the maximum tolerable, which creates a first blind speed of approximately 560 knots over ground clutter interference. Thus the system has a modest range such as 58 nmi, for example, and a velocity coverage of approximately 500 knots. Such a proposed system provides this coverage most effectively when the only interference is ground clutter. However, when simultaneous rain and ground clutter interference occur, severe degradation of sensitivity results at certain aircraft velocities (dim speeds). Referring to FIG. 1 as an example, the velocity response of such a proposed system with two pulse repetition frequencies in a combination of ground clutter and a particular case of rain clutter, is shown. In this example the velocity spectrum of the rain 20 is chosen to extend from approximately 15 to 55 knots. The portions of the curve that are cross hatched illustrate aircraft velocities which are processed with good sensitivity. However, between such cross hatched portions of the curve are velocities where sensitivity is seriously degraded, referred to at 10, 11, 12, 13 and 14 as well as at 15, 16, 17, 18 and 19. These notches represent the result of the system having adapted to the rain spectrum designated at 20, which is rejected by the deep clutter notch at 10. The other notches, 11 through 19, are not desired. Under these conditions, as shown in FIG. 1 the following dim speeds correspond to the clutter notches 11 through 19 as follows:

| Notch Number | Dim Speed Region |
|---|---|
| 11 | 125 to 181 knots |
| 12 | 288 to 300 knots |
| 13 | 350 to 362 knots |
| 14 | 456 to 500 knots |
| 15 | −75 to −125 knots |
| 16 | −231 to −244 knots |
| 17 | −294 to −306 knots |
| 18 | −400 to −437 knots |
| 19 | −525 to −600 knots |

Thus, it is desirable to provide an MTI system that provides detection of all aircraft velocities of interest, except those velocities close to the velocities of rain, chaff or ground clutter without severe degradation at doppler frequencies which are multiples of the PRF; or in other words, without blind speeds.

SUMMARY OF THE INVENTION

In accordance with the present invention, there is provided a doppler radar system combining variable interpulse periods and weighting to provide a plurality of filters, so constituted that the echo energy from desired aircraft velocities is distributed uniformly among the filters. When rain and ground clutter force the system to desensitize several of the filters, through constant false alarm rate actions, small losses result at all aircraft velocities other than the velocities corresponding to the interference itself, rather than extreme losses at certain velocities. Each filter is designed to suppress a designated band of interference, the width of the band being less than the average pulse repetition frequency. The time varying weights are employed in generating the filter outputs to compensate for the effects of the variable interpulse periods.

The digital filter bank includes filters which individually provide high attenuation of undesired signals over designated frequency bands, the width of which are a large fraction of $1/T_{av}$ where $T_{av}$ is the average period between data samples, and little or no attenuation of desired signals having doppler frequencies greater than $1/T_{av}$.

In one specific embodiment, the present invention provides for a method and system wherein the digital filter bank is created by a cascade combination of a two-pulse canceler and a filter bank employing time-varying weights for processing (N-1) outputs of the canceler to reduce the complexity of both the computational hardware and memory, when the dominant interference is centered on zero velocity. The system and method may provide for a digital filter bank created by a cascade combination of an M-pulse canceler and filter bank processing (N-M+1) outputs of the canceler where the canceler may employ either fixed or time-varying weights and the filter bank employs time-varying weights and M may be 3, 4, etc.

The outputs of the individual filters must be individually processed by CFAR devices, because the intensity of clutter interference in each filter is unique. The CFAR outputs may be combined to form a single detection decision or may be processed individually.

This generally involves post-detection integration of the number of echo pulses generated as the antenna beam scans past the target, and a detection is declared when the integrated amplitude exceeds a threshold value.

In one specific embodiment, the individual filters of the filter banks are combined at their outputs to form a single signal channel in which the presence of a target echo may be determined by comparison against a threshold level.

The system and method may also include means to selectively exclude or not exclude from the combination, the outputs of those filters of the bank which are designed to respond to zero or low velocity target or clutter echoes, which exclusion is based on the history of detected zero or low velocity echoes received over a multiplicity of previous radar scans in the outputs of the filters to be excluded.

BRIEF DESCRIPTION OF THE DRAWINGS

FIG. 3 is a general block diagram of a doppler filter bank signal processor according to the principles of the present invention;

FIG. 4 is a functional block diagram of a signal processor formed by two transversal filters in cascade to aid in the understanding of the method by which individual filters in the bank may be designed;

DESCRIPTION OF THE PREFERRED EMBODIMENT

Figure 1:
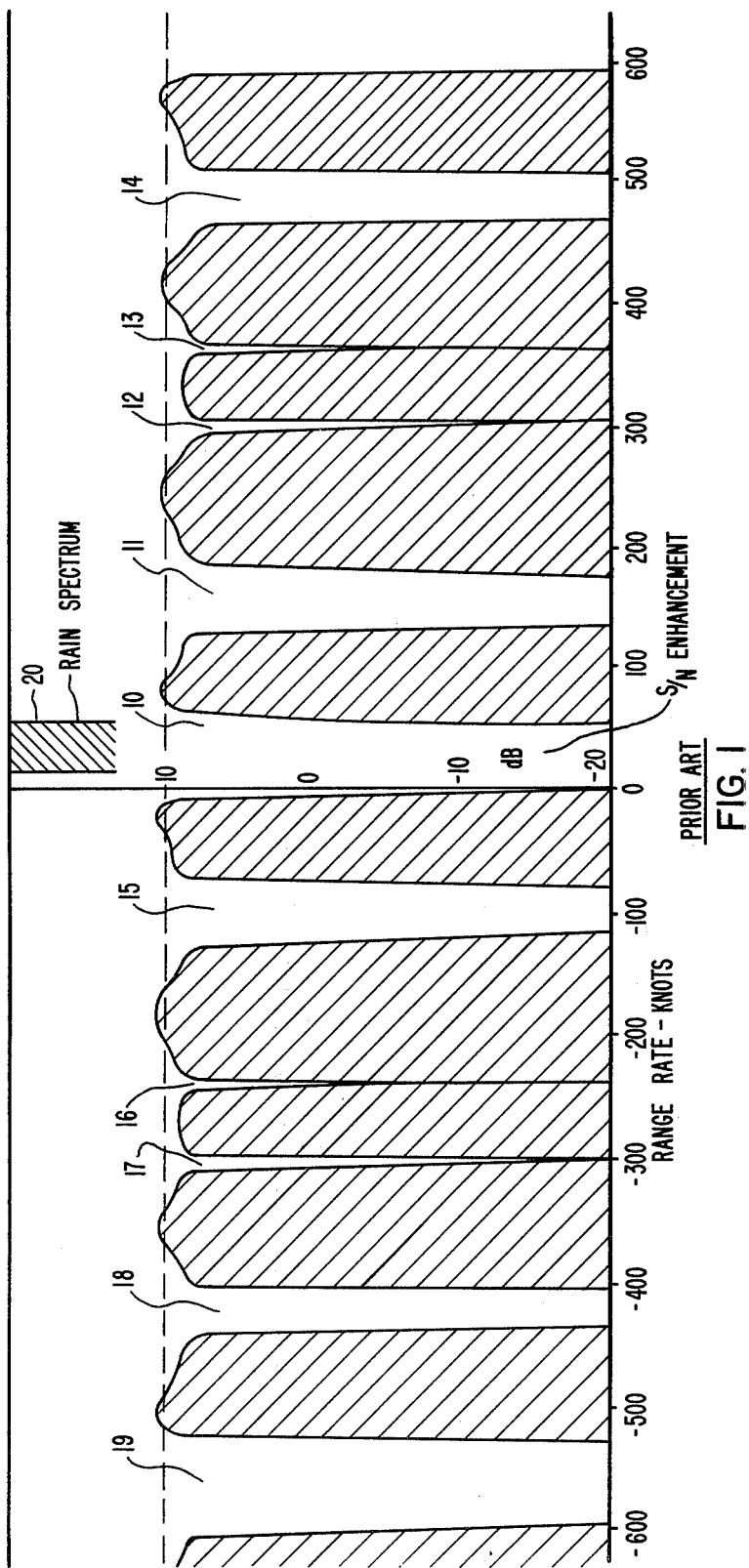
FIG. 1 is a graphical illustration of the estimated velocity response of a prior art device having two different pulse repetition frequencies in the presence of rain and ground clutter.

Prior to describing the specific embodiment illustrated in FIG. 2, it is believed that the present invention will be more readily understood by describing initially the general organization and function of the system.

With reference to FIG. 3, which is a block diagram of one embodiment of the VIP doppler filter bank signal processor of the present invention, there is included a total of seven different individual filters. The filters referred to as filter No. 1 and filter No. 7 are assumed to respond to zero velocity echoes and are used in conjunction with a CFAR system designed to desensitize or completely blank the outputs therefrom in ground clutter areas. This can be accomplished, for example, by a conventional form of clutter map well known in the art. The velocity response characteristic of filter No. 7 is a mirror image of the corresponding characteristic of filter No. 1 and the outputs of each are input to a gate 21, which functions to blank the filter outputs when so designated by the contents of the clutter map. Each of the five filters Nos. 2 through 6 provide a unique velocity response and are combined to provide a composite velocity response. This composite velocity response is dependent to a degree on the clutter interference which is suppressed by the constant false alarm rate device at each of the filter outputs. These devices, referred to at 22A through 22E are summed at their outputs by a conventional summing device 23; and then integrated by a conventional integrator 24. Although only one integrator 24 is shown in FIG. 3, a separate integrator could be employed for each individual filter 1 through 7. In FIG. 2, hereinafter described, the CFAR system is represented by the decoders 147 through 150, corresponding to a CPACS type of CRAR system, although it is noted that other forms of CFAR, such as cell-averaging or log CFAR would also be applicable.

The seven-filter system is used as one embodiment in that it represents a processor design which could be applicable to a radar operating at a transmitted carrier frequency of approximately 1.3 GHz. with a range of 100-150 nmi, for example. A typical VIP sequence as follows may be utilized with eight interpulse periods in the order listed, and expressed as percentage deviations from the average interpulse period:

−27.46%
−13.81%
+2.39%
+21.65%
−20.93%
−6.03%
+11.60%
+32.59%

The design of a bank of doppler filters to match the signal processor system described herein requires the synthesis of a relatively large number of different filters for any particular radar application. Specifically, it is the product of the number of filters and the number of different starting points in the VIP sequence for which each filter is implemented. The design of such filters was based on optimization of the individual filter responses to specific interference or clutter inputs spectra, as described hereinafter.

The filter design was made general in the sense that an adjustable parameter interference model was employed and also that the order of the individual filters in the number of filters used in the bank are selectable. The filters are synthesized in Finite Impulse Response (FIR) or transversal filter form because, in general, Infinite Impulse Response (IIR) or feedback filter forms, typically have an insufficient number of degrees of freedom in their design or weight parameters to be compatible with VIP operation.

The synthesis divides naturally into two phases, namely the synthesis of "ideal" filters, with optimized weights, expressed to a large number of significant numbers, and the approximation of these ideal filters by practical filters with weights expressed to a finite number of bits, optimized so that the required number is as low as possible. The approximation method is described hereinafter.

In general, doppler filters exhibit non-symmetrical frequency response characteristics, which require cross couplings between the in-phase (I) and quadrature (Q) channels of the filters to be described in more detail hereinafter. Equivalently, the VIP filter weights are of complex value. However, in order to cancel ground clutter, which exhibits a narrow, symmetrical spectrum, resulting primarily from antenna scan-modulation, it is necessary that the associated filter responses also include a deep symmetrical notch around zero frequency.

Thus, the concept of preceding the doppler filter bank processor with MTI canceler 25, which is common to the filters 2 through 6 of the bank which are those filters that are designed to respond to other than zero velocity returns. Such a canceler 25 would exhibit a symmetric characteristic and hence require only real-valued weights, with a corresponding reduction in complexity of that part of the processor. Cancellation of the ground clutter would also reduce the dynamic range requirements of the subsequent filters. Therefore, a preceding MTI canceler, with the capability of employing pre-selected time varying canceler weights is employed. An MTI canceler of the type shown and described is disclosed in detail in U.S. Pat. Nos. 3,560,972 and 3,566,402 to which reference is made for a more detailed discussion thereof.

The following is an analysis of the general situation of an M-pulse processor with pre-selected weights, preceding an N-pulse processor which is to be optimized to match a given clutter model. With reference to FIG. 4, consider a processor in the form of two transversal filters referred to within the dashed lines 26 and 27 connected in cascade and let the input to these filters be a sequence of samples $V_1, V_2, V_3$, etc. occurring at the corresponding times T1, T2, T3, etc. T1 is greater than T2 which is greater than T3 which is greater than the remaining times; and $V_1$ represents the sample entering the first filter at the time of interest; that is, the time at which the output is to be taken. The first filter 26 has time-varying weights, as indicated by the rotating switches 73, 74, and 75, where the set of weights used at times T1, T2, T3, etc. are assumed to be known and represented by the matrix A, where the nth row is the set of weights applicable at time $T_N$. A is an N x M matrix, when the first filter 26 has M weights and the second filter 27 has N weights. Let G be the N × (N+M−1) matrix formed from the elements of A (plus an appropriate number of zero elements) such that:

$$G = \begin{pmatrix} a_{11} a_{12} a_{13} a_{14} \cdots a_{1M} & 0 & 0 & \cdots & 0 \\ 0 & a_{21} a_{22} a_{23} \cdots a_{2M} & 0 & \cdots & 0 \\ 0 & 0 & a_{31} \cdots \cdots a_{3M} & \cdots & 0 \\ \vdots & & & & \vdots \\ \cdots & \cdots & a_{N1} \cdots & \cdots & a_{NM} \end{pmatrix}$$

Then the N data values, $U_1, U_2, \ldots U_N$, which reside in the memory 28a, 28b, 28c (shift register) of the second filter at time $t_1$ to form the elements of a vector u, where $u = Gv$ and the elements of v are $V_1, V_2, V_3 \ldots V_{(N+M-1)}$. The output of the second filter at time $t_1$, is then $y = b^T u = b^T G v$ where b is an N vector whose elements are the tap weights of the second filter. Now consider an input comprising sampled values of a unit amplitude sinusoid of frequency $\omega$ such that $$V_k = e^{-j\omega t_k}, \quad k = 1, 2, \ldots (N+M-1).$$

The squared amplitude of the corresponding output $y(\omega)$ is:

$$|y(\omega)|^2 = |b^T G v|^2 = \left| \sum_{k=1}^{N} b_k p_k \right|^2 = \sum_{k=1}^{N} \sum_{l=1}^{N} b_k b_l^* p_k p_l^*$$

where $p = Gv$ and the asterisk indicates conjugation. Integrating over the clutter frequency range (a,b), with weight $W(\omega)$, we obtain the clutter output power:

$$\int_a^b W(\omega)|y(\omega)|^2 d\omega = \sum_{k=1}^{N} \sum_{l=1}^{N} b_k b_l^* \int_a^b W(\omega) p_k p_l^* d\omega = b' Z b$$

where element (k,l) of matrix Z is $z_{kl} = \int_a^b W(\omega) p_k p_l^* \omega$, $W(\omega)$ is the assumed power spectral density of the clutter input and the prime indicates conjugate transpose.

$p_k$ is of the form $p_k = \sum_{i=1}^{N+M-1} g_{k,i} e^{-j\omega t_i}$ therefore, $$\int_a^b W(\omega) p_k p_1^* d\omega = \quad \text{Equation (1)}$$

$$\sum_{i=1}^{N+M-1} \sum_{j=1}^{N+M-1} g_{k,i} g_{1,j}^* \int_a^b e^{-j\omega(t_1 - t_j)} W(\omega) d\omega =$$

$$\sum_{i=1}^{M} \sum_{j=1}^{M} a_{ki} a_{lj}^* \int_a^b e^{-j\omega[t(i+k-1) - t(j+l-1)]} W(\omega) d\omega$$

The filter output is $y = b^T G v$. Thus the tap weights of an equivalent single stage filter are $b^T$. The filter noise gain is therefore, $$\| b^T G \|^2 = \sum_{j=1}^{N+M-1} \left| \sum_{i=1}^{N} b_i g_{ik} \right|^2 =$$

$$\sum_{k=1}^{N+M-1} \sum_{i=1}^{N} \sum_{j=1}^{N} b_i g_{ik} b_j^* g_{jk}^* =$$

$$\sum_{i=1}^{N} \sum_{j=1}^{N} b_i b_j^* \sum_{k=1}^{N+M-1} g_{ik} g_{jk}^* =$$

$$b' S b$$

where the prime indicates conjugate transpose and the element (i,j) of the matrix S is:

$$S_{ij} = \sum_{k=1}^{N+M-1} g_{ik} g_{jk}^*$$
i.e. $S = GG'$

The synthesis problem is thus to minimize the clutter output b'Zb subject to the constraint b'Sb = 1, corresponding to noise gain normalization. Forming the Lagrangian function, $$F = b'Zb - 1/\lambda (b'Sb - 1)$$

and setting $df/db = 2Zb - 2/\lambda Sb = 0$, we obtain the eigen value problem $$Z^{-1}Sb - \lambda b = 0,$$

assuming that Z is non-singular.

Multiplying by b'Z we see that the clutter/noise output power ratio is $$\frac{b'Zb}{b'Sb} = \frac{1}{\lambda} \quad \text{Equation (2)}$$

and, thus, the minimum clutter/noise corresponds to the largest (real) eigen-value of $Z^{-1}S$ which is a Hermitian matrix. The optimum filter tap weights are given by the associated eigen-vector, and will, in general, be complex.

The optimum filter synthesis problem thus reduces to a standard eigen-value problem which can be solved numerically by routine techniques. Preliminary steps required in the calculation are the several integrations indicated in equation (1) to form the matrix Z and the subsequent computation of its inverse. A discussion of the practical problems encountered in performing these computations is given hereinafter.

It may be noted that the special case corresponding to a single filter implementation (i.e. no preceding canceler) is included in the general case discussed above, with S equal to the identity matrix. In this case, the eigen-value equation can be re-arranged so that it is unnecessary to compute the inverse of Z prior to determining the eigen-vectors.

The foregoing synthesis produces "ideal", complex filter weights. Normalization by means of the constraint equation can be employed to achieve unity noise gain if desired. This is useful for purposes of presenting and assessing the resulting filter frequency response characteristics, but is of minor significance in the signal processor application, because the individual filter outputs are subjected to subsequent processing by the CFAR's (FIG. 3) which essentially removes all amplitude information from their outputs. Similarly, the CFAR circuit outputs are envelope detected, which effectively removes all phase information, so that the specific filter output phase is of no consequence. Thus, the filter outputs can be arbitrarily varied with respect to phase and gain, with no effect on system behavior. Equivalently, the filter weights may be arbitrarily scaled in amplitude or rotated in phase through the same phase angle for all weights in a filter, with no change in the overall signal processor behavior. Advantage can be taken of this fact by using phase and scaling constants to minimize the filter response errors resulting from the practical necessity of approximating the filter weights by a finite number of bits in their I and Q components. In effect, it is desirable to pick phase and scaling constants for each filter to minimize the necessary number of bits used to represent the ideal weights, while maintaining a good accuracy of approximation in the resulting filter response.

There appears to be no straightforward analytical approach to determining the best phase and scaling constants to use for a given accuracy of approximation. A search procedure is, therefore, indicated as the best practical way of determining the optimum constants. Since a phase rotation of 90° is equivalent to a simple interchange of I and Q weight components, it is evident that the search procedure need only cover a range of 0° to 90° in phase. Similarly, for binary representation of the weights, it is clear that scaling by a factor of 2 or more, effectively increases by one, the number of bits required. Thus, if one wishes to determine the best approximate filter, using weights having a specific number of bits, then the search procedure need only cover a 2:1 range in scaling, such that the most significant bit is always required in at least one of the I or Q components of the filter weights.

In implementing a search procedure to determine optimum gain and phase constants, the filter clutter/-noise output ratio, as given by equation (2) provides a suitable performance criterion and is recommended as the best design procedure as compared to a least squares weight error criterion for example.

Although the particular weights may be readily determined, the following are a list of typical weights that may be employed for filters No. 2 and filters No. 3, as shown in FIG. 3; and which are typical for the interpulse periods as previously described.

Specifically, the weights are applied to the I and Q components of the received echoes. These I and Q components are generated in the radar receiver at the outputs of synchronous detector circuits as described in greater detail hereinafter. The weights may thus be conveniently expressed in terms of their I and Q components, but alternatively they may be expressed in terms of magnitude A and phase $\phi$, where the magnitude A is equal to the square root of the sum of the squares of the corresponding I and Q components and the phase $\phi$ is equal to the four-quadrant arc tangent of the ratio of the corresponding Q components to the corresponding I components, i.e. $\phi = \tan^{-1}(d/c)$ where d is a Q component weight and c, is the corresponding I-component weight. Since the CFAR circuits which process the filter outputs are insensitive to the absolute amplitude and absolute phase of those outputs, the weights for any one filter are effectively arbitrary, with respect to any non-zero constant multiplier of each of their magnitude-components A, or to any fixed phase added to each of their phase-components $\phi$. In this respect, the corresponding I and Q components are also arbitrary with respect to the effects of these constant magnitude-multipliers and additive phase constants. The column of numerals at the extreme left side index the sequence of weights for the sequence of interpulse period variations applicable to these specific filters. The two columns under the heading "EXACT WEIGHTS" are the ideal or exact weights, as determined by the synthesis procedure previously described, expressed as magnitude and phase respectively. The Quantized Weights for the in-phase (I) and quadraphase (Q) channels are listed in the fourth and fifth columns, respectively. These quantized weights are the values actually used in the filter implementation. The interpulse period variations from the average interpulse period for the particular weights are shown in the extreme right-hand column. The quantized weights preceded by the numerals c1 through c9 and d1 through d9 correspond to the appropriately numbered and designated weights applied to the filter bank to be described in connection with FIG. 2.

It is to be noted that the typical weights for the filters No. 2 and 3 include a portion titled Part 2. This portion of the Table includes weights for a different starting point in the VIP sequence. Inasmuch as eight different filter characteristics are employed, and as hereinafter discussed, effective results can be obtained by utilizing only two such filters simultaneously, each of the filters has but two different starting points in the VIP sequence and thus only two different sets of weights are required for each velocity filter. The filter No. 4 weights are the same for both filters of FIG. 2. With the typical examples of weights given in the Tables and the procedures hereindescribed, the weights for the other filters are readily determined.

| FILTER #2 WEIGHT # | EXACT WEIGHTS MAG | EXACT WEIGHTS PHASE | QUANTIZED WEIGHTS I | | QUANTIZED WEIGHTS Q | | INTERPULSE PERIOD VARIATION |
|---|---|---|---|---|---|---|---|
| 1 | .0490 | 37.55° | (c1) | 6. | (d1) | 12. | −6.03% |
| 2 | .0860 | 17.55 | (c2) | −23. | (d2) | 13. | 11.60 |
| 3 | .1438 | 193.33 | (c3) | −25. | (d3) | −32. | 32.59 |
| 4 | .4053 | 267.17 | (c4) | 54. | (d4) | −63. | −27.46 |
| 5 | .4291 | 9.0 | (c5) | 60. | (d5) | 48. | −13.81 |
| 6 | .3016 | 85.43 | (c6) | −24. | (d6) | 46. | 2.39 |
| 7 | .1870 | 163.29 | (c7) | −34. | (d7) | −7. | 21.65 |
| 8 | .1649 | 251.58 | (c8) | 6. | (d8) | −39. | −20.93 |
| 9 | .0590 | 338.52 | (c9) | 15. | (d9) | 3. | |
| Part 2 | | | | | | | |
| 1 | .0699 | 26.10° | (C1) | 3. | (d1) | 10. | −13.81% |
| 2 | .1396 | 112.61 | (c2) | −19. | (d2) | 7. | 2.39 |
| 3 | .2095 | 192.70 | (c3) | −15. | (d3) | −27. | 21.65 |
| 4 | .4284 | 272.10 | (c4) | 48. | (d4) | −41. | −20.93 |
| 5 | .3969 | 0.0 | (c5) | 40. | (d5) | 43. | −6.03 |
| 6 | .2708 | 79.57 | (c6) | −24. | (d6) | 32. | 11.60 |
| 7 | .1795 | 152.57 | (c7) | −25. | (d7) | −9. | 32.59 |
| 8 | .2054 | 240.00 | (c8) | 9. | (d8) | −29. | −27.46 |
| 9 | .0810 | 331.82 | (c9) | 11. | (d9) | 4. | |

| FILTER #3 WEIGHT # | EXACT WEIGHTS MAG | EXACT WEIGHTS PHASE | INTERPULSE PERIOD VARIATION |
|---|---|---|---|
| 1 | .0440 | .202.65° | −20.93% |
| 2 | .0919 | 340.60 | −6.03 |
| 3 | .1210 | 107.71 | 11.60 |
| 4 | .1447 | 232.73 | 32.59 |
| 5 | .3742 | 0.0 | −27.46 |
| 6 | .3147 | 135.51 | −13.81 |
| 7 | .1701 | 265.97 | 2.39 |
| 8 | .0699 | 28.75 | 21.65 |
| 9 | .0497 | 164.09 | |
| Part 2 | | | |
| 1 | .0805 | 198.53° | −27.46% |
| 2 | .1604 | 331.52 | −13.81 |
| 3 | .1894 | 103.93 | 2.39 |
| 4 | .2024 | 231.34 | 21.65 |
| 5 | .3520 | 0.0 | −20.93 |
| 6 | .2532 | 132.19 | −6.03 |
| 7 | .1261 | 258.85 | 11.60 |
| 8 | .0580 | 21.32 | 32.59 |
| 9 | .0470 | 147.76 | |

As previously mentioned, the basic function of the filters which make up the VIP doppler filter bank signal processor is to combat two distinct forms of clutter interference; namely, rain and ground clutter. For the purposes of filter synthesis by the methods previously discussed, these interference sources can be adequately defined in terms of appropriate power spectral density models.

In practice, the ground clutter spectrum is usually determined by antenna scan modulation effects and is typically approximately gaussian in shape. Rain clutter spectra are much more variable, being dependent primarily on the distribution with height of wind shear and rain density, as well as on the antenna elevation pattern and, to a lesser extent, scan modulation. However, for synthesis purposes it is necessary to employ more simplified models, in order that the required integrations, defined by equation (1) herein can be performed without an excessive computational burden. Numerical integration of a gaussian ground clutter spectrum model consumed excessive computer time, so that the model was simplified to a simple symmetrical or isoseles triangular form, with the peak of the triangle being at zero velocity. Direct integration of the equation (1) by analytical means was then possible. Correspondingly, the rain clutter spectrum was modeled in highly simplified form as a constant power spectral density between two selectable velocity limits and was also analytically integrable in equation (1). Different choices of the velocity limits are applicable to the various filters No. 1 through 7 in the bank and were chosen as follows:

TABLE L

Rain Clutter Model Spectral Widths

| Filter No. (1) | Limits of Uniform Spectrum (2) |
|---|---|
| 1 | −0.74 to -0.08 |
| 2 | −0.60 to 0.05 |
| 3 | −0.46 to 0.19 |
| 4 | −0.325 to 0.325 |

Notes:
1) Filters 5, 6 & 7 use the mirror image spectrum of filters 1, 2 & 3.
2) Frequency scale normalized to inverse of average prf.

The peak value of the ground clutter model was chosen as 30 dB above the rain clutter level. It was found that the width of ground clutter spectrum that could be handled effectively by the non-zero velocity filters was different depending on whether or not a multi-stage pre-canceler MTI filter was employed. For a two-pulse MTI/filter combination and a single stage processor the base width of the triangular spectrum was set at 0.116 on a doppler frequency/average pulse repetition frequency scale. For the case of a four-pulse pre-canceler, a ground spectrum base width of 0.05 was used.

Figure 5:
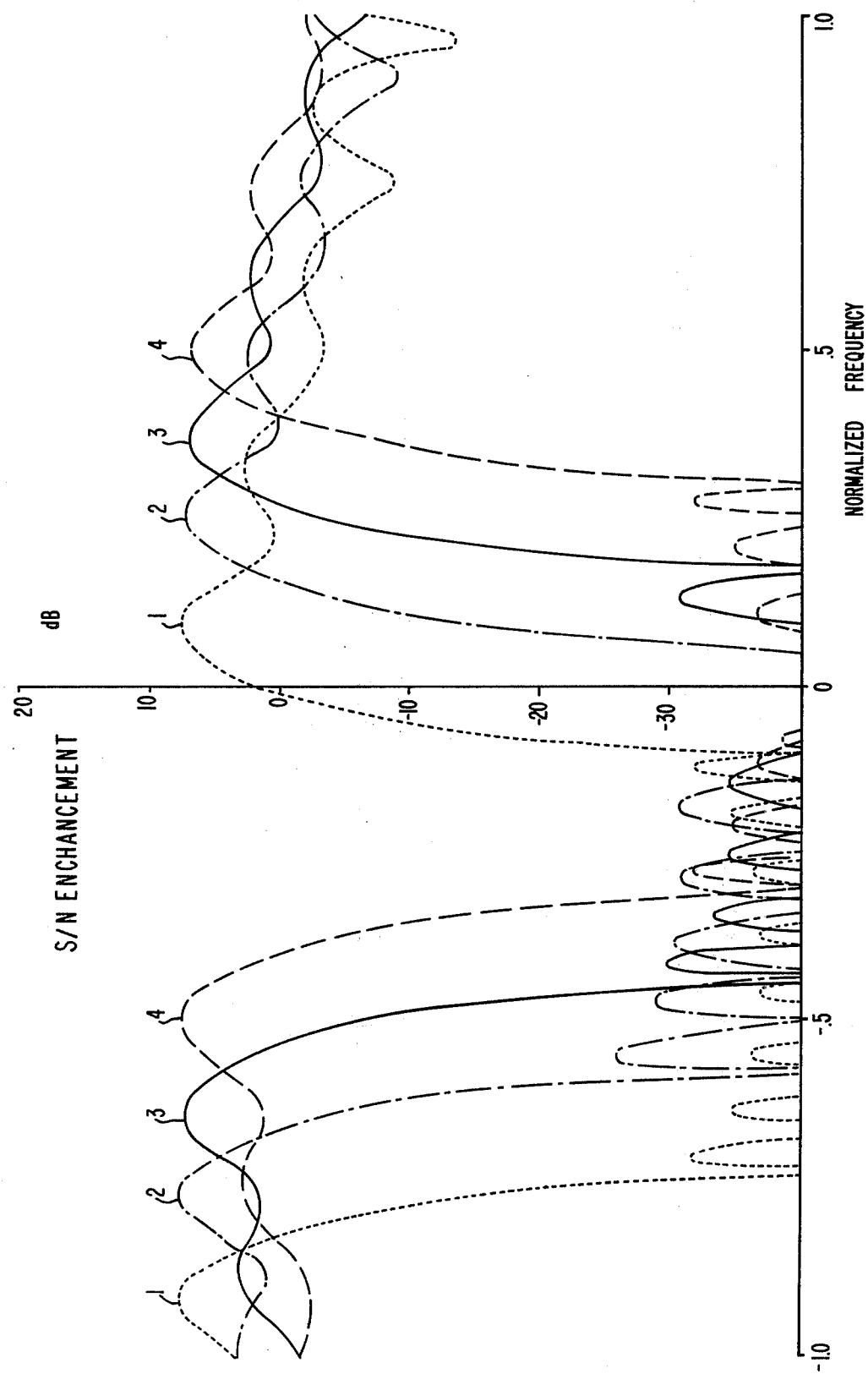
FIG. 5 illustrates the response of the individual VIP filters in a system of the present invention.

Referring to FIG. 5, the response characteristics of filters No. 1 through 4 are illustrated by the similarly legended curves. These filters are shown as being synthesized as single stage, ten-pulse processors, using the clutter models previously described. The responses are shown for just one of the eight possible starting points in the VIP sequence. These filters are appropriate for providing approximately 30 dB rain clutter rejection and 55 dB MTI improvement factor against ground clutter. The waveforms have been made in small dashed, large dashed, alternately dotted and dashed, and solid line form in order to more readily distinguish between the curves for each of the individual filters. To avoid confusion, filters 5, 6 and 7 are not shown in FIG. 5, because these are mirror images of filters 3, 2 and 1, respectively.

Figure 6:
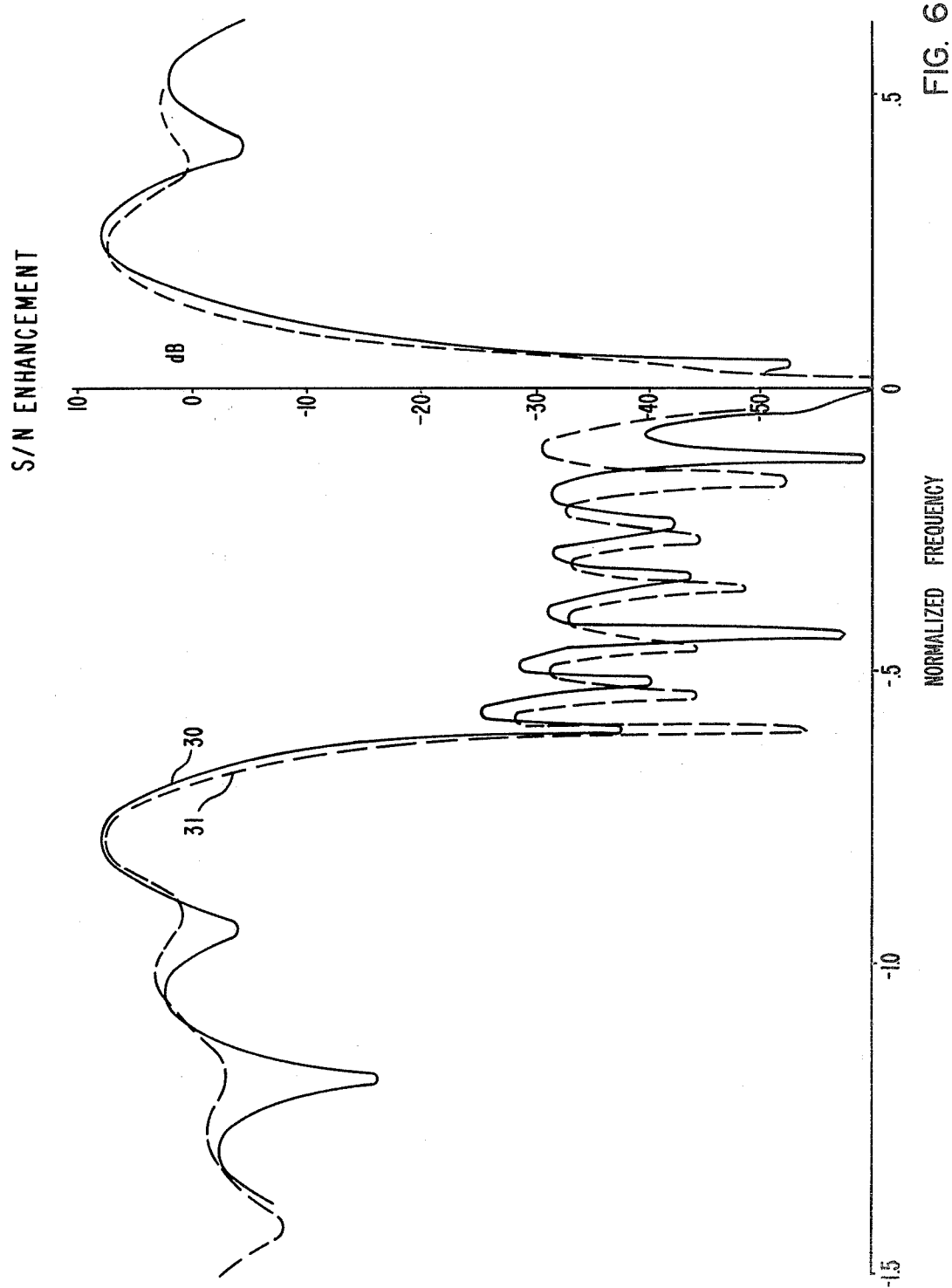
FIG. 6 is a graph illustrating the response of one of the filters in a system utilized with a preceding two-pulse canceler and a four-pulse canceler.

Referring to FIG. 6, a solid waveform referred to as 30 illustrates, for the case of filter No. 2 that essentially the same type of response is achieved by synthesizing the filter as a cascade two-pulse canceler and nine-pulse processor. The dashed waveform 31 shows that when the same filter No. 2 is synthesized as a cascade four-pulse canceler and seven-pulse processor the rain clutter rejection notch can be achieved only at the expense of narrowing the ground clutter notch. This is true even though the notch performance of the four-pulse canceler itself is of comparable width and greater depth than that of waveform 30. The filter illustrated by the waveform 31 is synthesized using the symmetrical triangular form ground clutter spectrum model as previously described.

Figure 7:
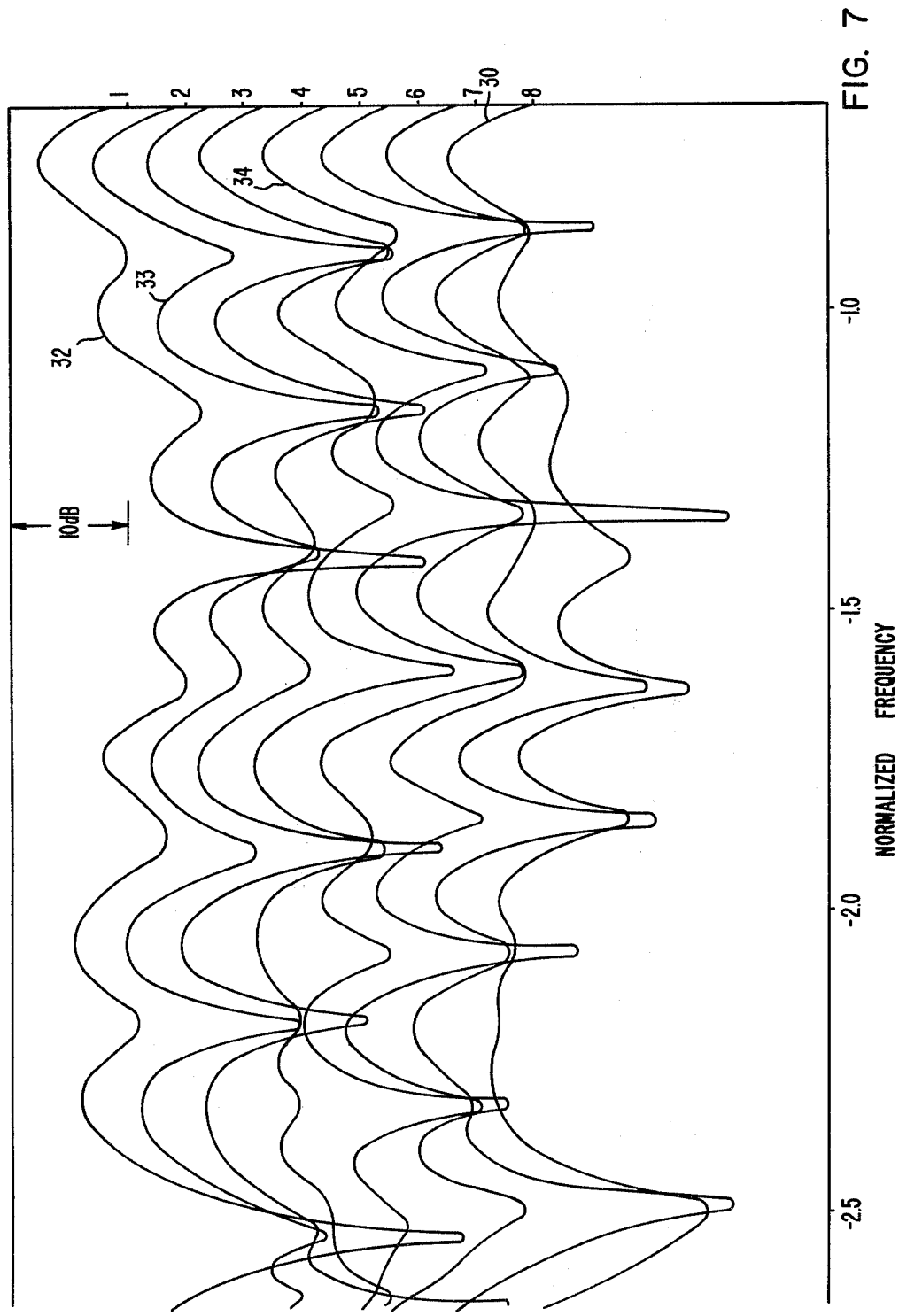
FIG. 7 is a series of waveforms illustrating the responses of one of the filters for eight successive starting points in the variable interpulse period sequence.
Figure 8:
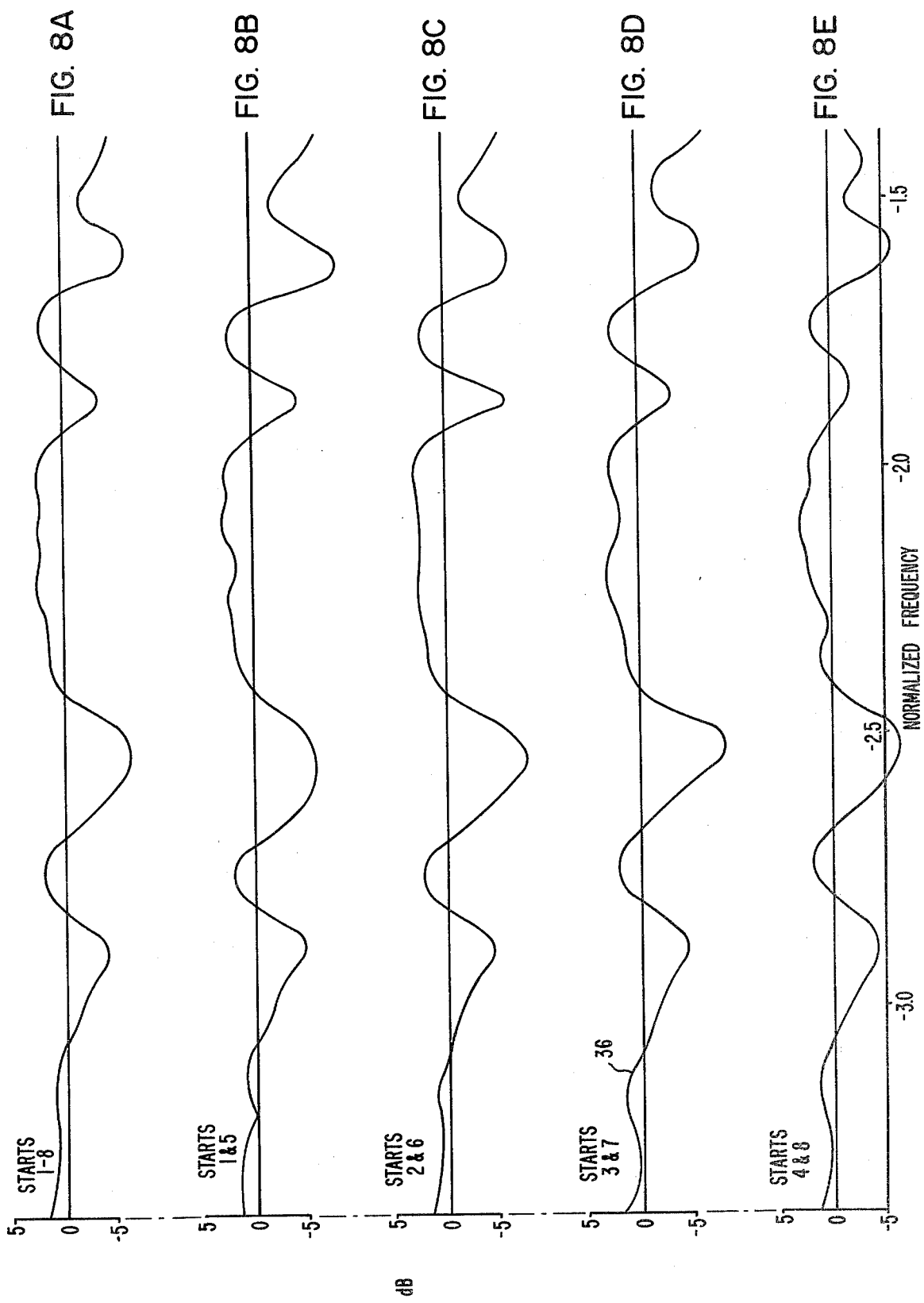
FIGS. 8A through 8E are a series of waveforms showing the averages of the responses of a typical filter of the filter bank of the present invention with different starting points in the variable interpulse period sequence.

Each filter in the doppler filter bank can at least in principle be synthesized for every possible starting point in the VIP sequence, of which there are eight in the described embodiment for the example filters. The clutter regions of each one of these eight different designs will thus be very similar. However, outside the rejection region, the different starting points in the VIP sequence provide different responses. For example, in referring to FIG. 7 a family of curves is illustrated with respect to filter No. 2; the curves are vertically separated by 5 dB to reduce confusion. These curves show that with respect to starting points 1 through 8 of the VIP sequence, adjacent starting points in the sequence give similar responses. For example, curves 32 and 33 of FIG. 7 are relatively similar, but those which are most widely spaced in the sequence for example, curve 30 and curve 34, or curve 32 and 34 are the most different.

Referring to FIGS. 8A through 8E, the power average of all the responses together with the averages of all possible pairs of filters separated by at least four points in the VIP sequence is illustrated by the curves shown thereon. For example, it is apparent that there is relatively little difference between the overall power average and the average of each individual pair. In terms of flatness, the pair of filters represented by waveform 36 which start in the third and seventh position of the VIP sequence, is slightly preferable. These curves also show that in terms of practical filter implementation there is little to be gained in response flatness by sampling the filter output more frequently than once every four pulses. Thus, time multiplexing of the filter circuitry as shown schematically in FIG. 2 may be utilized as hereinafter described.

Figure 9:
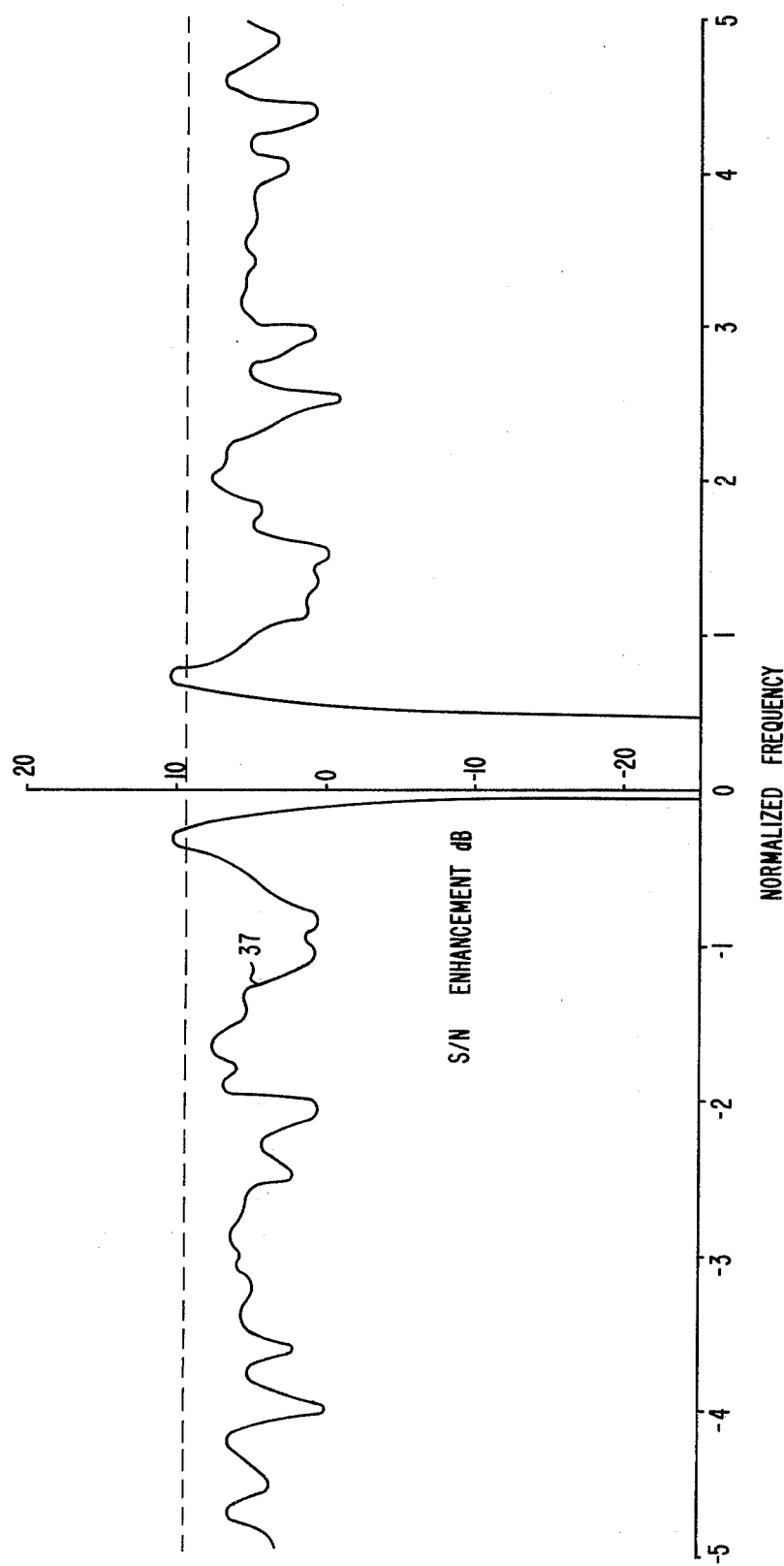
FIG. 9 is a graph illustrating the velocity response of a system utilizing a doppler filter bank of the present invention in the presence of rain and ground clutter.

The filters 1 through 4, having their responses as described in connection with FIG. 5 are used as the basis for the response of the VIP doppler filter bank signal processor of the present invention in rain and ground clutter as shown in FIG. 9. With reference to FIG. 9, the chosen rain model provided for rejecting rain with a maximum velocity corresponding to 44% of $1/T_{av}$ where $T_{av}$ is the average interpulse. For an L-band radar with 120 nmi. of instrumented range, such a maximum velocity corresponds to a rain velocity of 48 knots. Under these conditions, the only filters not desensitized by either rain or ground clutter interference were filters No. 2 and 3.

Referring to curve 37 of FIG. 9 which was computed starting with the responses of filters Nos. 2 and 3 of FIG. 5, the gain of each filter was normalized with respect to its noise gain, and the average of the filter output voltage amplitudes was formed as a function of frequency. This form of averaging was chosen because it corresponds to the voltage integration by integrator 24 as shown in FIG. 3. The 0 dB level of this resulting response was then adjusted upwards by 5.1 dB, representing the net integration gain of the filter output combining process to give the resulting response shown by the curve 37 of FIG. 9. The 5.1 dB adjustment was obtained from the combination of 1.5 dB collapsing loss with a 6.6 dB non-coherent integration gain on the assumption of 20 hits per beamwidth. It is also assumed, in accordance with the block diagram of FIG. 3 that the zero velocity sensitive filters, No. 1 and its image No. 7, were gated off in the coverage region concerned. Thus, multiplexing the filter pairs on a 4:1 basis, as previously mentioned, the non-desensitized filters Nos. 2 and 3 produce five outputs each per beamwidth to which are added fifteen noise-only outputs from the desensitized filters. The collapsing ratio is, therefore, 2.5 for which the corresponding collapsing loss is approximately 1.5 dB. The noncoherent integration gain is obtained as the signal-to-noise enhancement of 7.6 dB due to integration of the ten output signals with target echo content computed at 90% $P_D(P_{fa} = 10^{-6})$ for a Swerling one target, less 1 dB representing an allowance for the effects of partial noise correlation in successive outputs of either filter. $P_D$ is the probability of target detection and $P_{fa}$ is the probability of false alarm in the absence of a target echo.

Figure 10:
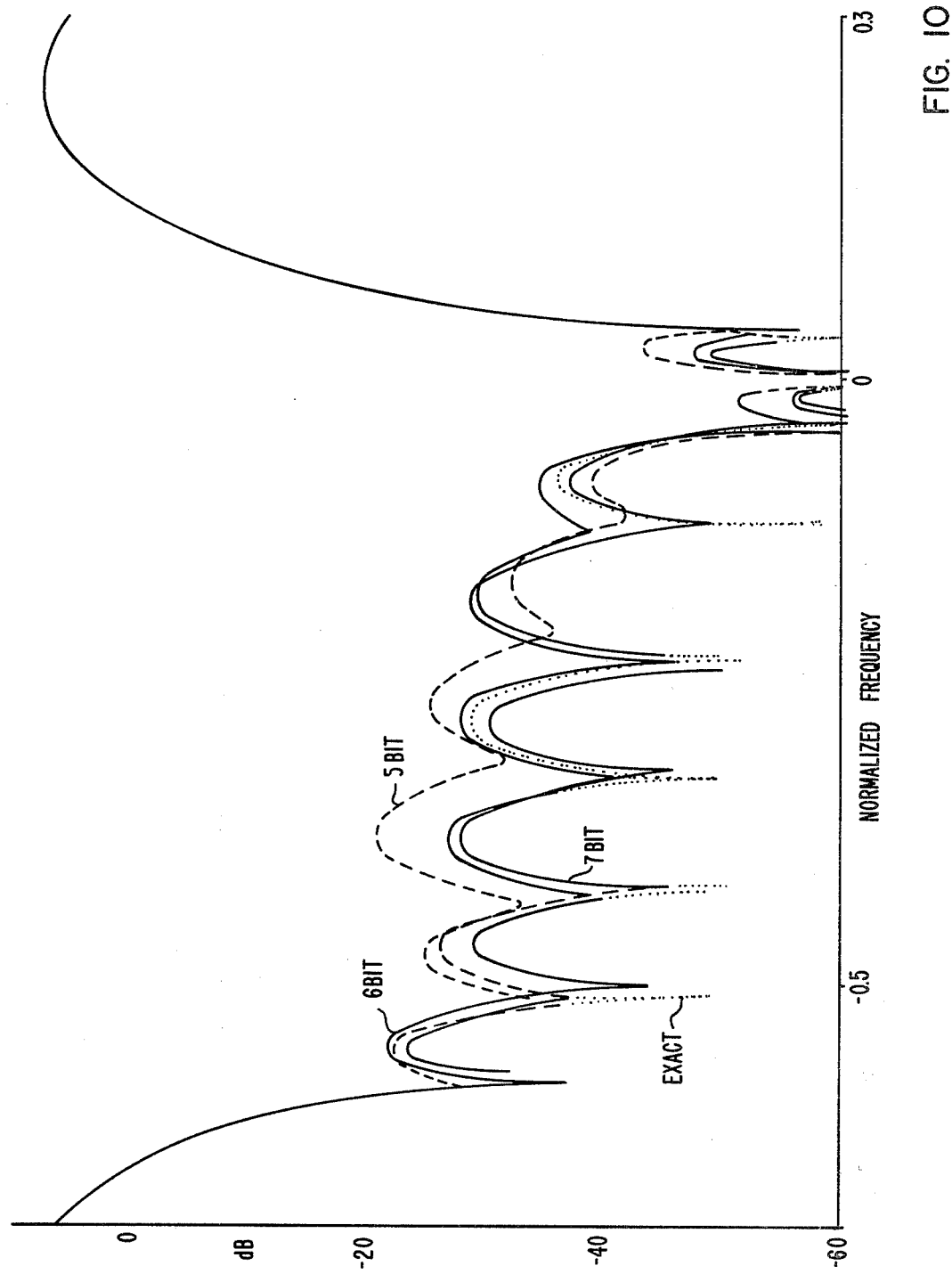
FIG. 10 illustrates the responses of the filter bank with various quantized weights.

The filter No. 2 in FIG. 5 with a starting point of three in the VIP sequence as shown in FIG. 7 is used to illustrate weight quantization. This was carried out by the procedure previously described. Referring to FIG. 10, the notched characteristics for the best phase and scaling constants are shown by the appropriately legended waveforms for 5, 6, and 7 bit weight representative and with effectively the exact weights. The ideal filter utilized in this case is synthesized as a ten-pulse processor and then reconfigured as a two-pulse canceler followed by a nine-pulse processor. As shown in FIG. 2, the nine-pulse processor weights were then quantized and the optimum set picked by the search procedure on the basis of the clutter/noise output ratio criterion. It is clear that seven bit quantization is needed in this case to avoid significant response degradation. It is noticed (see table of quantized weights for filter No. 2, for example) that the optimum phasing tends to be such that the large weight vectors lie near 45° with respect to the I or Q axes and with near maximum allowable scaling gain.

In picking optimum quantization on the alternative basis of least-squares quantization error, the response degradation tends to be most serious near normalized frequencies of 0.5 or −0.5. This is explainable on the basis that although the quantization errors tend to be random and independent from weight-to-weight in the nine-pulse processor so that the effect on the response of that processor is roughly uniform with frequency, nevertheless, the preceding two-pulse canceler which has a null at zero and peaks near the frequencies of ± 0.5, emphasizes the errors near ± 0.5 frequency in the overall response while depressing those near zero. Of course, these errors are only noticeable when they fall in the clutter rejection notch; i.e., at −0.5 frequency. Thus, as noted previously, the least-squares error criteria is not to be preferred.

As previously mentioned, the individual filter output sampling rate may be set at one-fourth the radar pulse repetition frequency without significantly degrading the flatness of the filter band characteristics. Thermal noise also produces correlated outputs from the individual filters, so that from a noise smoothing viewpoint, as well, there is no serious penalty from using a reduced filter output sampling weight. On this basis, the arithmetic units used to implement the filters can be multiplexed on a 4:1 basis so that a pair of filter outputs is generated each interpulse period. By picking the filters as complex conjugate pairs (mirror image in the frequency domain) the arithmetic hardware is further simplified. Note that the filter No. 4 in FIG. 5 is its own conjugate.

Use of a pre-canceler circuit ahead of the nonzero velocity filters has the advantage of reducing the required dynamic range of those filters, but as previously mentioned, a two-pulse canceler is preferable to a four-pulse canceler in the forms of the achievable ground clutter notch width. Although, the canceler is not required for filter No. 1 or its mirror image, filter No. 7, its presence does not interfere with creating this filter pair.

Figure 2A:
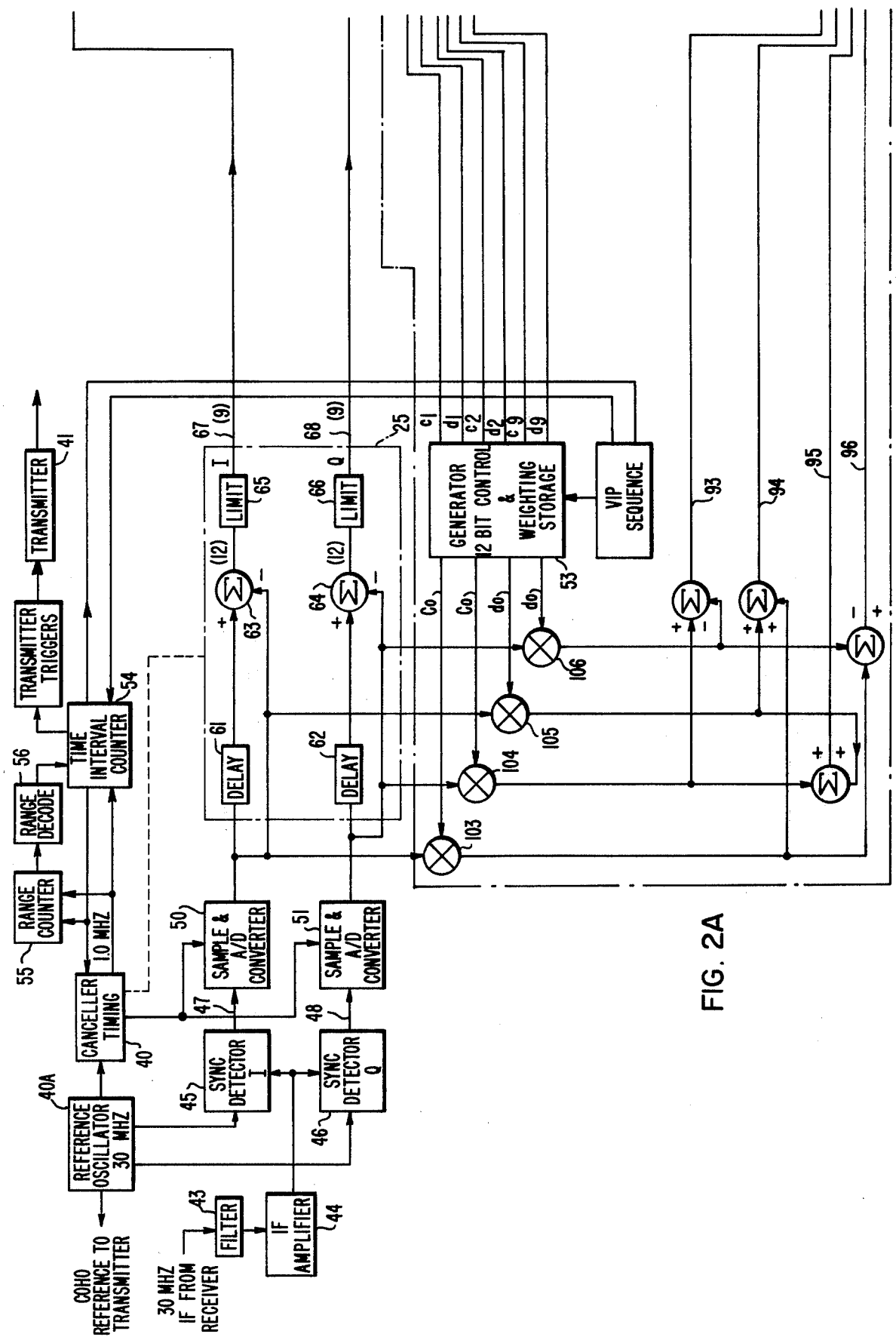
FIGS. 2A and 2B are a schematic block diagram of a system according to one embodiment of the present invention.
Figure 2B:
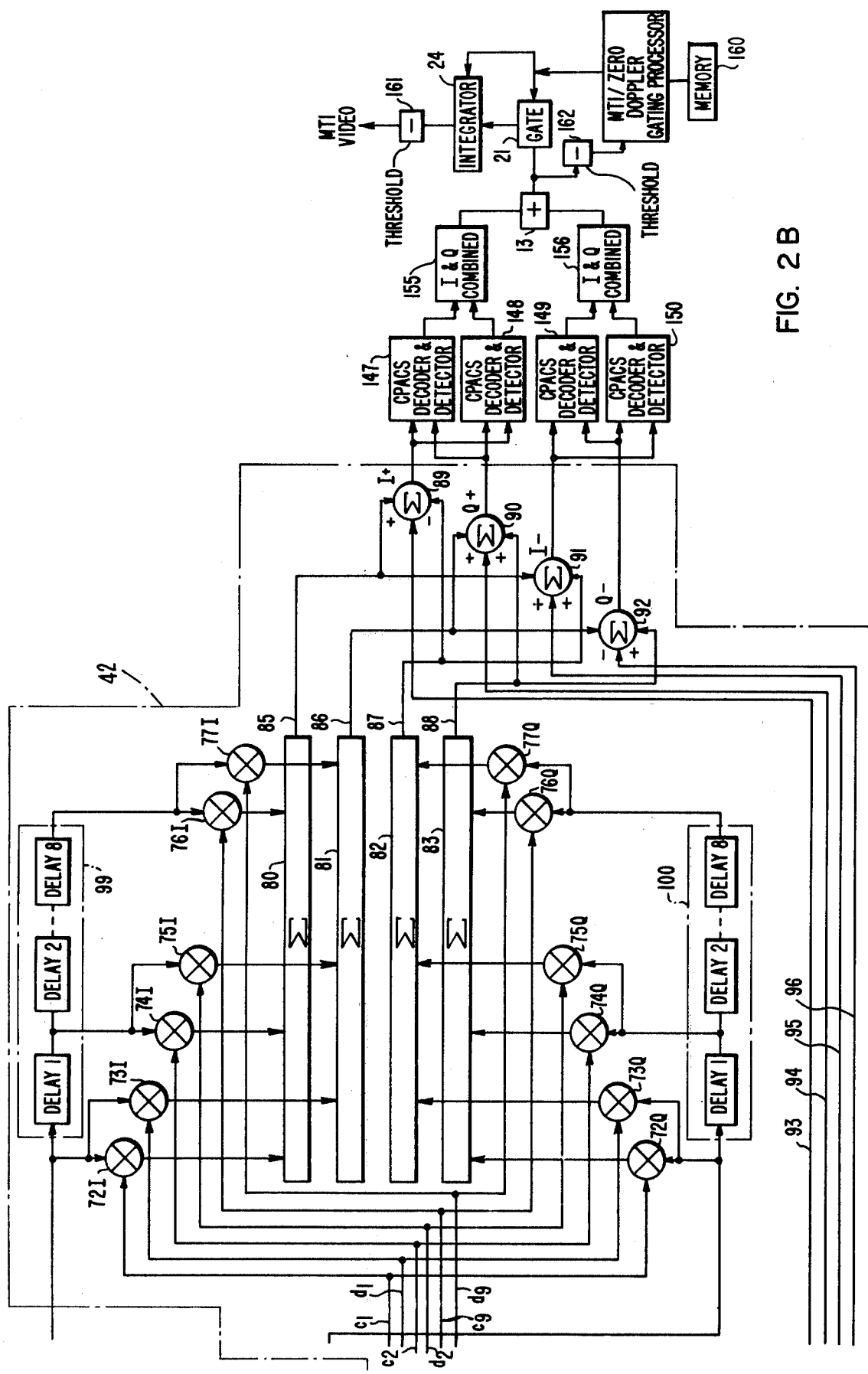

In accordance with the above, and referring to the preferred embodiment of FIGS. 2A and 2B, a stable reference oscillator 40A (FIG. 2A) provides a coherent reference frequency for generation of the transmitted pulse (output of 41) as well as for generation of the clock frequency for a two-pulse MTI canceler and doppler filter bank signal processor referred to within the dashed lines 42 and 25. The transmitter may, for example, provide a coded pulse output, suitable for use with a CPACS decoder to achieve CFAR action in the receiver. An incoming IF signal, after suitable filtering and amplification at 43 and 44 respectively, is directly converted to bipolar video by synchronous detectors 45 and 46. Both I and Q synchronous channels 47 and 48, $I = A \cos \theta$; $Q = A \sin \theta$, and in which $A$ = the amplitude of the echo; $\theta$ = the phase of the echo relative to the local oscillator, are provided to improve detectability and to permit phase information to be extracted after cancellation. The analog information at the outputs of the synchronous detectors 45 and 46 are fed to sample and A to D converters 50 and 51 respectively. The analog information containing each component of the vector is sampled at 1 microsecond interval, for example, and converted into a 12 bit digital word. A synchronizer 40 provides the necessary timing for the radar transmitter 41 as well as providing all internal timing for the canceler 25 and signal processor 42. All timing is derived from the 30 megahertz reference oscillator 40A. A conventional read-only-memory 53 serves as the variable interpulse period generator which stores each of the N interpulse periods as digital numbers together with the associated weights for each interpulse period. A time interval counter 54 clocks the desired variable interpulse period while a range counter 55 defines each range. More specifically, the range counter 55 counts clock pulses which may be 1 MHz for example to define each discrete range cell. At minimum processing range, the generator 53 begins to receive start pulses. Minimum range may be zero as well as any other desired range. The basic interpulse period is generated by the combined counting of the range counter 55 and the time interval counter 54. A particular pulse timeperiod is derived by decoding a discrete range in a range decoder 56, which then initiates the time interval counter 54 at a fixed time.

The pulse echo received from the target is amplified by the IF amplifier 44, which could have a 20 megahertz band width, for example, and provide well over 40 dB gain. The amplifier 44 is preceded by a 1 MHz bandwidth crystal filter 43. The maximum level required by the synchronous detectors 45 and 46 is +5 dbm corresponding to a level, for the least significant bit, of −43 dbm. Since the noise input to the amplifier 44 is −80 dbm, the gain of the amplifier will be adequate.

The synchronous detectors 45 and 46 each may utilize Schottkey barrier diodes as detectors, for example. An input level is injected to each detector from the oscillator 40. This is mixed with the amplified received signal. The output from each is then filtered and sent to a respective A to D converter 50 or 51. A 90° phase shifter is inserted in the out-of-phase or Q oscillator 46 to provide the desired quadrature phase relationship. The bipolar video signals from the synchronous detectors 45 and 46 are sampled by the sample and hold circuit portions of 50 and 51; and are converted into digital words.

The sample and A to D converters 50 and 51 may be a sequential converter using a voltage summing pattern network with the sample and hold circuit portion being of similar construction; or, such converters may be combined in a hybrid analog-digital configuration of the type described in U.S. Pat. No. 3,894,219, issued to Wayne L. Weigle. The complete timing and control logic for the A to D converters 50 and 51 are self-contained and only two inputs are required to each of the converters, namely the analog video and the sampling clock.

At this point in the description, it should be pointed out that following each radar transmission, the echo components (I) and (Q) are sampled periodically, with a spacing equal to or less than the range resolution of the radar and converted to digital numbers. The digital numbers, which are stored for N-1 interpulse periods, are multiplied by desired weighting coefficients, and are summed to form the desired filter outputs. The output of each filter is subjected to further processing as hereafter described. The circuit 42 is preceded by the two-pulse MTI canceler 25 which is a first stage of all the filters, with the exception of the zero velocity filters, includes delay devices 61 and 62 and summing devices 63 and 64. The input to the delay devices 61 and 62 is obtained from the I and Q outputs of the synchronous detectors 45 and 46 which are converted to digital form by the A to D converters 50 and 51. The A to D converters provide an output data spacing equal to or less than the range resolution of the radar. For example, one microsecond spacing corresponds to a range resolution of approximately one-twelfth of a nautical mile. The digital signals are stored for one complete range sweep of the radar in the digital storage elements 61 and 62 and then combined with the signals from the next sweep in the two-pulse canceler 25 previously described. The output of the canceler circuit is fed to a bipolar digital limiter 65 and 66 respectively to change the number of bits from 12 to 9. Pulse memory stages subsequent to the bipolar digital limiters in circuit 42 store nine bits of data rather than the twelve bits of input data from the two-pulse canceler. The filters are implemented by taking the outputs of the two-pulse canceler on lines 67 and 68 and feeding them to the filters formed by circuit 42. The required weights for these filters, referred to as $c_1$ through $c_9$ and $d_1$ through $d_9$ in general involve non-zero values for all components except in the special case of Filter No. 4 (see FIG. 5) for which the $d_1$ through $d_9$ components are all zero. Necessary weight values are different for each of the filters and also depend on the particular point in the VIP sequence at which they are applied as hereinbefore described. Each set of the required weights are pre-computed and stored in the VIP generator twelve bit control referred to at 53. This control 53 contains a read-only-memory constant table portion for storing the weights.

It is recalled that the filters 1 through 7 preferably are multiplexed on a 4 to 1 basis to conserve hardware; and that the filters are formed in coupled conjugate pairs except filter No. 4. Therefore, the radar echo pulses from the two-pulse canceler 25 are weighted by the set of weights for filters No. 1 and 7, followed by the set of weights for filters No. 2 and 6, then the set of weights for filters No. 3 and 5, then No. 4, then again by filters No. 1 and 7, etc.

Thus, although the filter bank 42 of FIG. 2 only requires the effective formation of just two filters, at any one instant, the principle is the same as that described in connection with FIG. 3.

The filter bank 42 includes an eight pulse delay line 99 and an eight pulse delay line 100. The delay line 99 accepts the I component of each echo pulse and the line 100 accepts the Q component. The I component pulses from the two-pulse canceler 25 are weighted with the first weights $c_1$ and $d_1$ by multipliers 72I and 73I respectively. The first delayed pulses are weighted with the second weights $c_2$ and $d_2$ by multipliers 74I and 75I, respectively, and so on until the eighth delayed pulses are weighted with the ninth weights $c_9$ and $d_9$ by multipliers 76I and 77I. The Q component of each current and stored echo pulses are similarly weighted with the same numbered c and d weights by multipliers 72Q through 77Q.

The weighted pulses are summed by devices 80 through 83 to provide intermediary output on lines 85 through 88. These outputs are then further combined in summers 89 through 92 to form the I and Q outputs of a filter pair. The inputs to the summers 89 and 92 also include the signals on lines 93 through 96, which comprise weighted output pulses from the A/D converter 50 and 51. The weights used for these A/D converter output pulses are chosen to be identically zero for all filters except those giving a zero-velocity response, namely filters 1 and 7, as explained herein. The outputs of summers 89 and 90 form the I and Q outputs respectively of one filter, while the outputs of summers 91 and 92 form the I and Q outputs respectively of the corresponding mirror image filter.

It is recalled, that the weights for each filter are different depending on the starting time in the VIP sequence. Therefore, the set of weights for filter 2 and 3, for example, corresponds to the first listed set in the previously described Table at one time, and four pulses later corresponds to the set of weights entitled "Part 2". Because of the 4 to 1 multiplexing only two different sets of weights at the most are required for each filter.

The zero velocity filters 1 and 7 are formed in essentially the same way as the non-zero velocity filters 2 through 6 except that the weighted sums include components from the A/D converters 50 and 51 as well as the output from the two-pulse canceler 25. The A/D outputs are multiplied by weights $c_0$ at multipliers 103 and 104, and are multiplied by weights $d_0$ at multipliers 105 and 106. The particular set of weights for the zero velocity filter may be formed as taught in connection with the procedure described for weights of the zero velocity filters having no preceding canceler but with the following exceptions. The weights for the zero velocity filters as implemented in FIGS. 2A and 2B, are synthesized in two steps. The first step comprises the synthesis of filters having the desired zero velocity characteristics by the precedure previously described for determining the filter weights when no preceding canceler circuit is used; this synthesis is carried out for filters with a total number of weights which is two greater than the number of delays in the delay lines 99 and 100, namely ten weights in the case shown. Let the result of this synthesis procedure be set by weights $c_0'$ through $c_9'$ for the I components and $d_0'$ through $d_9'$ for the Q components. The second step is then to form the values of the weights actually used in the circuits of FIG. 2 from the relationships $$c_k = \sum_{i=k}^{9} c_i'$$

$$d_k = \sum_{i=k}^{9} d_i'$$

for all values of k from 0 to 9.

The I and Q outputs 89 through 92 of the filter circuits provide the inputs to the decode and detect circuits 147 through 150. The decoder and detector circuits 147, 148, 150, and 151 may be conventional decoder circuits followed by an envelope detector which is illustrated in the same box and are well known conventional elements that provide the CFAR radar function. It should be noted that each individual filter output is controlled prior to combination at adder 13 and integrator 24. The envelope detected signals are fed to a feedback integrator 24 through a gate circuit 21 which either passes or inhibits the zero velocity filter outputs, depending upon the contents of a conventional clutter map memory storage 160. The radar coverage is divided into a large number of relatively small range/azimuth cells (e.g. 4 Nmx 3°) and a separate memory entry is stored at 160 for each cell. This memory entry is used to either enable or inhibit the gate circuit 21 for the zero velocity filter outputs. The contents of the memory 160 may be established manually or may be generated from the short term history of several previous scans of the zero velocity filter signals and are intended to indicate whether or not the corresponding range/azimuth cells are clutterfree. When the zero velocity circuits are inhibited, the gain and bias levels of the integrator are changed to maintain the same false alarm rate performance against a fixed threshold at the integrator output. Crossings of this threshold give a single channel target detection output for the processor.

Thus, there has been described an improved VIP doppler filter bank signal processor having a plurality of filters which individually provide high attenuation of undesired signals over designated frequency bands, the widths of which are a large fraction of $1/T_{av}$, where $T_{av}$ is the average period between data samples, and little or no attenuation of desired signals having doppler frequencies greater than $1/T_{av}$. Such a digital filter bank utilizes variable interpulse periods and weighting to achieve this desired frequency. Also, there has been described a digital filter bank having the above characteristics together with the procedure for determining the optimum variable weighting coefficients which is created by a cascade combination of a two-pulse canceler and a filter bank employing time-varying weights for processing (N-1) outputs of the canceler to reduce the complexity of both the arithmetic hardware and memory. It is understood that although the system has been described in connection with a two-pulse canceler that any other type of canceler or no canceler, can be used in accordance with the teaching of the present invention.

It is understood, that where a cascade combination of a two or more pulse canceler and a filter bank is utilized that the canceler may employ either fixed or time varying weights and the filter bank employ time varying weights. Also, although the outputs of the individual filters are combined by adding their rectified outputs to form a single signal channel in which the presence of a target echo may be determining by comparison against a threshold level wherein a single integrator is used for all the filters of the system, it is understood that individual integrators may be utilized if desired. Also, the system can be modified to provide for a detection decision at the output of the CFAR units for each respective individual filter. It is further understood, that such a system could be utilized wherein the additional provision of excluding or not excluding the outputs of the filters which are designed to respond to zero or low velocity target or clutter echoes, and where the exclusion is accomplished either manually or automatically on the basis of the history of detected zero or low velocity echoes received over a multiplicity of previous radar scans and the outputs of the filters.

It is also understood, that various other interpulse periods may be utilized and that more or less interpulse periods in the VIP sequence as well as more or less filters may be used in accordance with the teachings of the present invention, for example, as well as other modifications without departing from the spirit or scope of the present invention as defined by the claims.

What we claim is:

1. In a pulse doppler radar system, the combination comprising:
   means for generating radar pulses at predetermined variable interpulse periods;
   means for receiving the echo pulses;
   means for converting the sampled pulses to digital words;
   a plurality of digital filters, each filter having I and Q components;
   said plurality of digital filters being operative to receive the digital words in sequence at the sample times, each of said filters being constituted to provide attenuation to pulse echoes from objects less than a predetermined velocity over a different predetermined doppler frequency band, each said filter having a single rejection notch, the width of which is a large fraction of the reciprocal of the average period between the sampled pulses, each said filters being constituted also to provide substantially no attenuation to pulse echoes having doppler frequencies greater than the reciprocal of said average period;
   means responsive to clutter interference in each filter to desensitize the outputs of the respective filter to prevent false alarms from clutter; and
   means to detect the output values of the desensitizing means.

2. In a system according to claim 1 wherein each of said digital filters includes means to weight a plurality of echo pulse digital words to provide said attenuation characteristics.

3. In a system according to claim 2 wherein the weighting means includes weights selected to have similar clutter notch characteristics regardless of the particular time in the variable interpulse period sequence its respective filter output is generated.

4. In a system according to claim 1 wherein the detection means for the output of the desensitizing means includes means to combine the output of each desensitizing means, and means to detect the combined output when the output is above a predetermined threshold value.

5. In a pulse doppler radar system, the combination comprising:
   means for generating radar pulses at time intervals having variable interpulse periods;
   means for receiving the pulse echoes;
   means for converting the pulse echoes to digital words;
   a plurality of digital filters each having I and Q components, including a storing means operative to store a plurality of input digital words;
   each said filter having a single rejection notch, the width of which is a large fraction of the reciprocal of the average period between transmitted pulses to provide substantial attenuation to signals over predetermined doppler frequency bands having widths less than the reciprocal of the average period between transmitted pulses and substantially no attenuation to echo pulses having doppler frequencies greater than the reciprocal of the average period;
   means to store a set of weighting coefficients for each filter, each coefficient being selected to reject echo pulses of predetermined doppler frequencies when applied to a predetermined plurality of stored digital words;
   means to multiply a predetermined set of the stored weighting coefficients by the stored digital words the weighting coefficients being selected in accordance with the variable interpulse periods of transmission of the echo pulses corresponding to the time separation of the digital words in each filter;
   means to output the sum of the weighted words of each filter;
   means for each filter responsive to the weighted words representative of clutter interference to desensitize the filter output to prevent excessive clutter false alarm;
   means to integrate the outputs of the desensitizing means; and
   means to detect the integrated outputs above a predetermined threshold value.

6. In a system according to claim 5, further comprising:
   a second means for storing at least one digital word, means for applying weighting coefficients to the stored words and the most recent digital word to occur to improve clutter rejection, and means for outputting the sum of the weighted digital words to each of the filters.

7. In an MTI system according to claim 6 wherein the second means is operative to store at least two digital words.

8. In a system according to claim 6 wherein the weights of the second means vary in accordance with the interpulse period variation of the transmitted radar pulses.

9. In a system according to claim 5 wherein the sets of weights correspond to at least five distinct filters each having different clutter rejection characteristics.

10. In a system according to claim 5 further comprising zero velocity filter means, the output of which is summed with the output of the desensitizing means.

* * * * *